(12) United States Patent
He et al.

(10) Patent No.: US 9,756,045 B2
(45) Date of Patent: Sep. 5, 2017

(54) METHOD, DEVICE AND COMPUTER-READABLE MEDIUM FOR ENABLING VIRTUAL SUBSCRIBER IDENTITY MODULE CARD

(71) Applicant: Xiaomi Inc., Beijing (CN)

(72) Inventors: Yao He, Beijing (CN); Guilin Liu, Beijing (CN); Zhongyu Yang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/380,469

(22) Filed: Dec. 15, 2016

(65) Prior Publication Data

US 2017/0195321 A1    Jul. 6, 2017

(30) Foreign Application Priority Data

Dec. 30, 2015  (CN) .......................... 2015 1 1027819

(51) Int. Cl.
*H04M 1/00*    (2006.01)
*H04B 1/38*    (2015.01)
(Continued)

(52) U.S. Cl.
CPC ...... *H04L 63/0853* (2013.01); *H04L 61/6054* (2013.01); *H04W 88/06* (2013.01)

(58) Field of Classification Search
None
See application file for complete search history.

(56) References Cited

U.S. PATENT DOCUMENTS 8,532,706 B2    9/2013  Kaul
8,676,180 B2 *  3/2014  Srinivasan ........ H04M 3/42382
                                                    455/415
(Continued)

FOREIGN PATENT DOCUMENTS

CN    102932531 A    2/2013
CN    104185171 A   12/2014
(Continued)

OTHER PUBLICATIONS

International Search Report corresponding to International Appln. No. PCT/CN2016/087521 dated Sep. 18, 2016, 12 pages.
(Continued)

*Primary Examiner* — Tuan A Tran
(74) *Attorney, Agent, or Firm* — Brinks, Gilson & Lione

(57) ABSTRACT

Method, device and computer-readable medium for enabling a virtual Subscriber Identity Module (SIM) card are provided in the disclosure, which belongs to a technical field of communication. The method includes: receiving an initiation instruction for initiating the virtual SIM card; detecting a current talk mode of a communication device based on the initiation instruction, the current talk mode includes a single-card mode; and installing a target talk mode corresponding to the current talk mode according to the current talk mode, the target talk mode includes a dual-card mode. The method and device for enabling a virtual SIM card may solve the problem that the virtual SIM card may not coexist with a physical SIM card in a single-card mode communication device, and may achieve an effect that the virtual SIM card and the physical SIM card may coexist with each other.

20 Claims, 14 Drawing Sheets

(51) Int. Cl.
*H04L 29/06* (2006.01)
*H04L 29/12* (2006.01)
*H04W 88/06* (2009.01)

(56) References Cited

U.S. PATENT DOCUMENTS

| | | | | |
|---|---|---|---|---|
| 2009/0061839 A1* | 3/2009 | Zimmerman | ............ | H04W 8/22 |
| | | | | 455/419 |
| 2010/0210304 A1 | 8/2010 | Huslak | | |
| 2010/0311468 A1* | 12/2010 | Shi | ............ | H04W 4/003 |
| | | | | 455/558 |
| 2011/0059738 A1* | 3/2011 | Waller | ............ | H04W 8/26 |
| | | | | 455/433 |
| 2011/0086670 A1* | 4/2011 | Shin | ............ | H04W 8/205 |
| | | | | 455/558 |
| 2014/0220952 A1 | 8/2014 | Holtmanns et al. | | |
| 2015/0215773 A1* | 7/2015 | Bai | ............ | H04W 8/183 |
| | | | | 455/418 |
| 2016/0142088 A1* | 5/2016 | Smith | ............ | H04B 1/3816 |
| | | | | 455/558 |
| 2016/0352917 A1* | 12/2016 | Pieda | ............ | H04M 15/771 |
| 2017/0033823 A1* | 2/2017 | Smith | ............ | H04W 8/18 |

FOREIGN PATENT DOCUMENTS

| | | |
|---|---|---|
| CN | 104243707 A | 12/2014 |
| CN | 104394522 A | 3/2015 |
| CN | 105516508 A | 4/2016 |
| CN | 106028305 A | 10/2016 |
| KR | 10-2012-0051056 A | 5/2012 |

OTHER PUBLICATIONS

Extended European Search Report dated Mar. 24, 2017 for European Application No. 16202814.6, 16 pages.
Office Action dated May 31, 2017 for Korean Application No. 10-2016-7023140, 4 pages.

* cited by examiner

METHOD, DEVICE AND COMPUTER-READABLE MEDIUM FOR ENABLING VIRTUAL SUBSCRIBER IDENTITY MODULE CARD

CROSS-REFERENCE TO RELATED APPLICATION

This application claims priority to Chinese Patent Application No. 201511027819.8, filed on Dec. 30, 2015, the entirety of which is hereby incorporated by reference herein.

TECHNICAL FIELD

The present disclosure relates to a technical field of communication, and more particularly, to a method, a device and computer-readable medium for enabling a virtual Subscriber Identity Module (SIM) card.

BACKGROUND

A virtual SIM card enables a communication device (e.g., a smart cell phone) to be switched freely between networks of different operators. For example, unlike a physical SIM card, a virtual SIM card used by a communication device need not be changed, when a user switches the communication device from a network of operator A to another network of operator B.

A user may operate a virtual SIM card on a communication device according to a talk mode that enables use of a single card. When a user enables a virtual SIM card on a communication device, the communication device may configure International Mobile Subscriber Identification Number (IMSI) resource information of the virtual SIM card on a preset physical card slot according to an initiation instruction triggered by the user, and may then perform an accessing operation for allowing the virtual SIM card to access a network based on the IMSI resource information.

SUMMARY

A method, a device and a computer-readable medium for enabling a virtual SIM card are provided by the present disclosure. The technical solutions are set forth as follows.

According to a first embodiment, a method for enabling a virtual Subscriber Identity Module (SIM) card is provided. The method may include: receiving an initiation instruction for initiating the virtual SIM card; detecting a current talk mode of a communication device based on the initiation instruction, the current talk mode includes a single-card mode; and installing a target talk mode corresponding to the current talk mode according to the current talk mode, the target talk mode includes a dual-card mode.

In a second aspect, a device for enabling a virtual Subscriber Identity Module (SIM) card is provided. The device may include: a receiving module configured to receive an initiation instruction for initiating the virtual SIM card; a detecting module configured to detect a current talk mode of a communication device based on the initiation instruction, the current talk mode includes a single-card mode; and an installing module configured to install a target talk mode corresponding to the current talk mode according to the current talk mode, the target talk mode includes a dual-card mode.

In a third aspect, a device for enabling a virtual Subscriber Identity Module (SIM) card is provided. The device may include: a processor; and a memory for storing instructions executable by the processor. The processor is configured to: receive an initiation instruction for initiating the virtual SIM card; detect a current talk mode of a communication device based on the initiation instruction, the current talk mode includes a single-card mode; and install a target talk mode corresponding to the current talk mode according to the current talk mode, the target talk mode includes a dual-card mode.

In a forth aspect, a non-transitory computer-readable storage medium having instructions stored thereon is provided. The instructions, when executed by a processor of a communication device, cause the communication device to perform a method for enabling a virtual Subscriber Identity Module (SIM) card. The method may include: receiving an initiation instruction for initiating the virtual SIM card; detecting a current talk mode of a communication device based on the initiation instruction, the current talk mode includes a single-card mode; and installing a target talk mode corresponding to the current talk mode according to the current talk mode, the target talk mode includes a dual-card mode.

It is to be understood that both the forgoing general description and the following detailed description are exemplary and explanatory only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Explicit embodiments of the present disclosure are illustrated in the accompanying drawings, which will be described in further details below. The accompanying drawings and texts are only for showing the conception of the disclosure to those skilled in the art by reference to particular embodiments, and are not meant to limit the idea of the disclosure in any way.

DETAILED DESCRIPTION

Reference will now be made in detail to exemplary embodiments, examples of which are illustrated in the accompanying drawings. The following description refers to the accompanying drawings in which same reference numbers in different drawings represent same or similar elements unless otherwise described. The implementations set forth in the following description of exemplary embodiments do not represent all implementations consistent with the disclosure. Instead, they are merely examples of devices and methods consistent with aspects related to the disclosure as recited in the appended claims.

Figure 1:
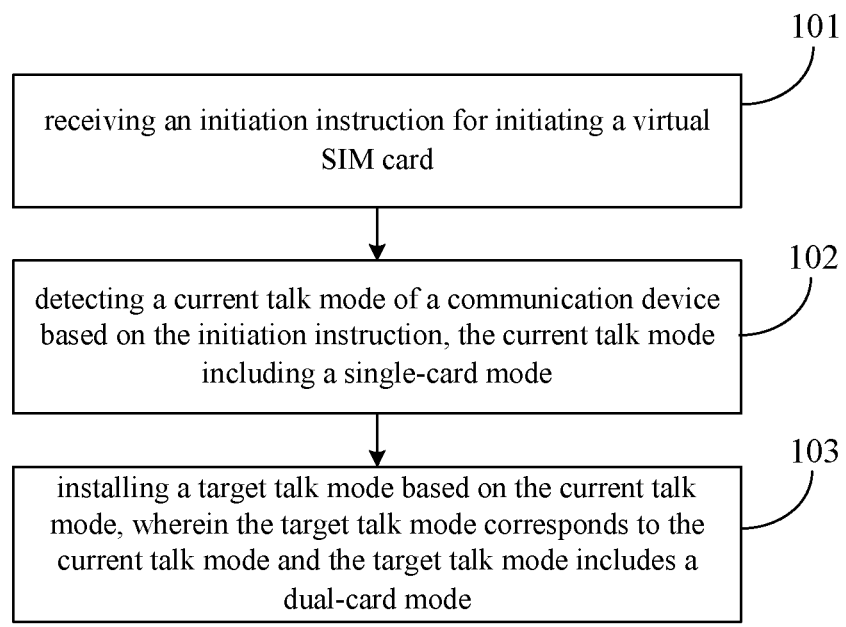
FIG. 1 is a flow diagram illustrating a method for enabling a virtual Subscriber Identity Module (SIM) card according to an exemplary embodiment.

FIG. 1 is a flow diagram 100 illustrating a method for enabling a virtual Subscriber Identity Module (SIM) card according to an exemplary embodiment. The method for enabling a virtual SIM card may be implemented by a communication device and may include following steps. The communication device described herein may include a computing device including the software and hardware for communication with other communication devices over a communication network. For example, the communication device may be a smartphone, laptop, cellular phone, or other computing device.

In step 101, an initiation instruction for initiating the virtual SIM card is received by the computing device. The initiation instruction may be a command generated by an application for implementing the method described by flow diagram 100. Alternatively, the initiation instruction may be a user command input to the communication device through a graphical user interface displayed on a display screen of the communication device, an input button on the communication device, or other user input components on the communication device.

In step 102, a current talk mode of the communication device is detected based on the initiation instruction. The current talk mode may include a single-card mode that enables use of a single physical SIM card by the communication device.

In step 103, a target talk mode may be installed on the communication device based on the current talk mode. The target talk mode may be related to the current talk mode and the target talk mode may include a dual-card mode that enables the communication device to additionally use the virtual SIM card, in addition to the physical SIM card.

According to this exemplary method for enabling a virtual SIM card, the communication device may detect the current talk mode running on the communication device after the initiation instruction for initiating the virtual SIM card is received. The communication device may further install the target talk mode corresponding to the current talk mode when the current talk mode is determined to be the single-card mode. This way, the single-card mode may be changed to the dual-card mode, where the dual-card mode enables use of the virtual SIM card. This method for enabling a virtual SIM card achieves the result of a virtual SIM card and a physical SIM card coexisting in a communication device previously operating under the single-card mode.

Figure 2:
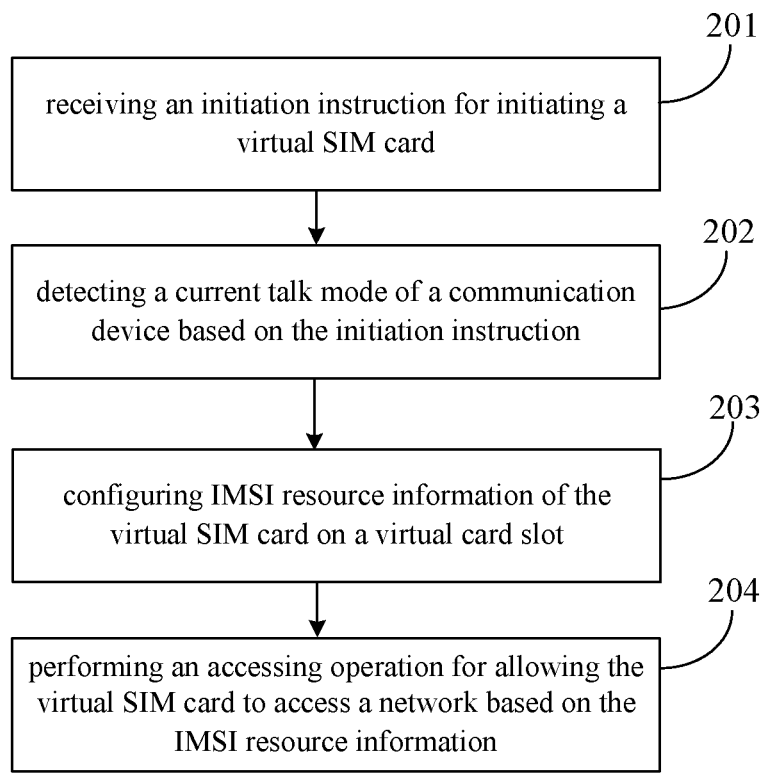
FIG. 2 is a flow diagram illustrating a method for enabling a virtual Subscriber Identity Module (SIM) card according to an exemplary embodiment.
Figure 4:
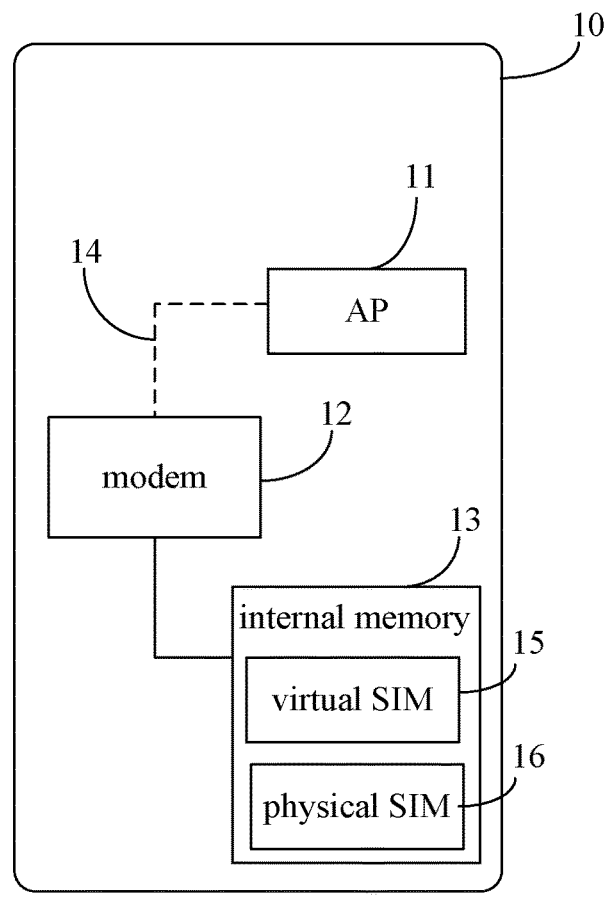
FIG. 4 is a structural schematic diagram of a communication device used in the method for enabling a virtual SIM card shown in FIG. 2.

FIG. 2 is a flow diagram 200 illustrating a method for enabling a virtual Subscriber Identity Module (SIM) card according to an exemplary embodiment. The method for enabling a virtual SIM card may be applied to a communication device and may include the following steps. FIG. 4 shows a structural schematic diagram of an exemplary communication device 10 for implementing the method described by flow diagram 200. The communication device 10 may include an application processor (AP) 11, a modem 12, and an internal memory (i.e., a memory) 13. The communication device 10 may be a cell phone, a tablet, a laptop and so on. A communication interface 14 may be configured between the AP 11 and modem 12, which is used to transmit messages between the AP 11 and modem 12. The internal memory 13 is configured to include a virtual SIM card 15. According to some embodiments, the internal memory 13 is further configured to include a physical SIM card 16 and/or include a slot for receiving a physical SIM card 16.

In step 201, an initiation instruction for initiating the virtual SIM card is received by the communication device 10. The initiation instruction may be a command generated by an application running on the communication device 10 for implementing the method described by flow diagram 200. Alternatively, the initiation instruction may be a user command input to the communication device 10.

Figure 3:
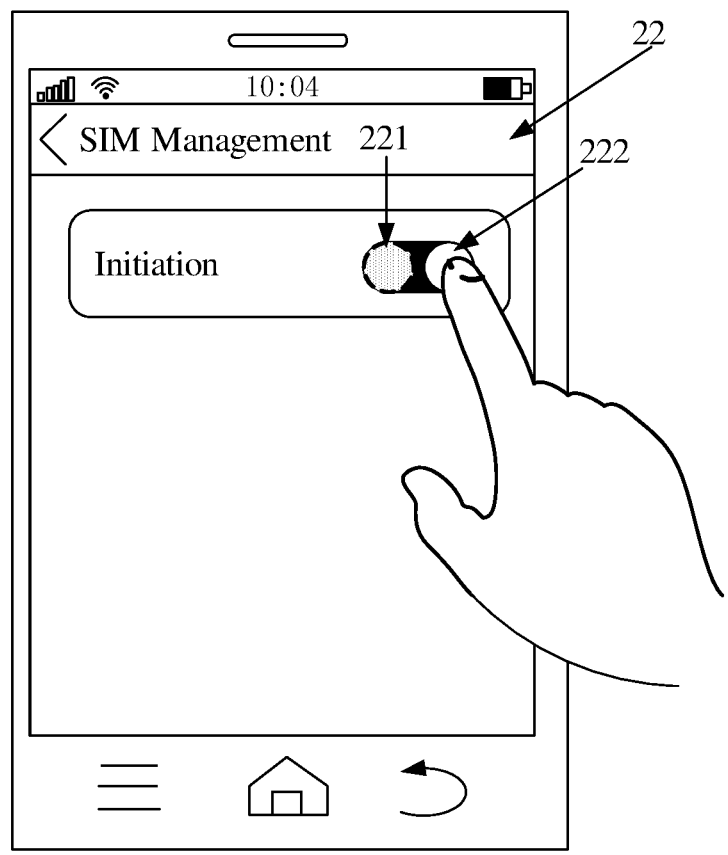
FIG. 3 is a schematic diagram of an interface when a user is initiating the virtual SIM card in the method for enabling a virtual SIM card shown in FIG. 2.

When a user wants to use the virtual SIM card on the communication device 10, the user may initiate the virtual SIM card via a SIM card management interface on the communication device 10. At the same time, the initiation instruction for initiating the virtual SIM card may be generated. The communication device 10 may receive the initiation instruction for initiating the virtual SIM card. The communication device 10 may receive the initiation instruction for initiating the virtual SIM card by an application processor (AP). The AP may be a processor included in the communication device 10 that is dedicated to running one or more specific applications. For example, the AP may be a dedicated processor for running an application that implements the method described by flow diagram 200. FIG. 3 shows a schematic diagram of a SIM card management interface 22 displayed on a display screen of communication device 10, where the user initiates the virtual SIM card by activating a toggle button. The toggle button includes a non-initiated position 221, and an initiated position 222. The user initiates the virtual SIM card by toggling the toggle button from non-initiated position 221 to initiated position 222.

In step 202, a current talk mode of the communication device 10 is detected based on the initiation instruction.

The current talk mode may include a single-card mode.

Figure 5:
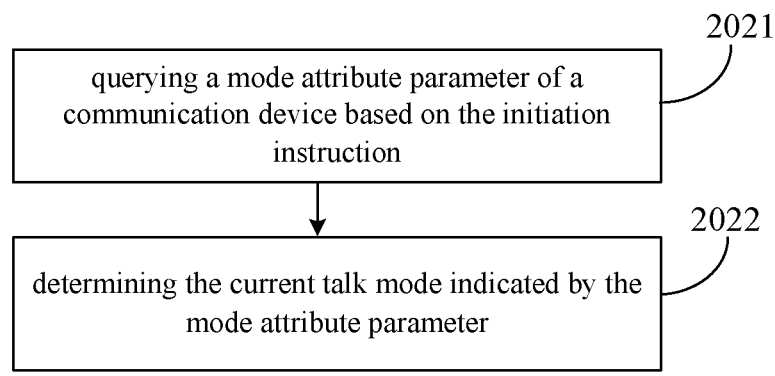
FIG. 5 is a flow diagram for detecting a current talk mode of the communication device in the method for enabling a virtual SIM card shown in FIG. 2.

Optionally, step 202 may include the following sub-steps, as shown by flowchart 500 described in FIG. 5.

In sub-step 2021, a mode attribute parameter of the communication device 10 is queried based on the initiation instruction.

There may be a mode attribute parameter in a communication device's 10 configuration file identifying the talk mode of the communication device 10. The mode attribute parameter may be, for example, persist.radio.multisim.config.

In a single-card mode for the communication device 10, the mode attribute parameter may be set as persist.radio.multisim.config=none. In a dual-card mode for the communication device 10, the mode attribute parameter may be set as persist.radio.multisim.config=dsds. Related arts may be referenced for details of the mode attribute parameter. Therefore, a communication device 10 may query the mode attribute parameter of itself based on the initiation instruction, and may determine whether it is operating under a single-card mode or a dual-card mode based on the mode attribute parameter.

In sub-step 2022, the current talk mode indicated by the mode attribute parameter is determined.

For example, the communication device 10 may determine that the current talk mode is the single-card mode when persist.radio.multisim.config=none.

The target talk mode corresponding to the current talk mode may be the dual-card mode, when the current talk mode is the single-card mode. The communication device 10 may include a physical card slot and a virtual card slot. Operations (such as, authentication for network access) corresponding to the virtual SIM card may be performed on the virtual card slot. Table 1 shows the current talk mode of the communication device 10 and a corresponding relationship between the current talk mode and corresponding target talk mode. As shown in Table 1, the target talk mode corresponding to the current talk mode is the dual-card module, which may include dual-card single-pass mode.

TABLE 1

| current talk mode of the communication device | target talk mode corresponding to the current talk mode |
|---|---|
| single-card mode | dual-card module |

According to step 202, the communication device 10 may install the target talk mode corresponding to the current talk mode according to the current talk mode, after the current talk mode is determined based on the initiation instruction. The target talk mode corresponding to the current talk mode may be the dual-card module, when the current talk mode is the single-card mode. Alternatively, the process of installing the target talk mode corresponding to the current talk mode according to the current talk mode may include steps 203 and 204.

In step 203, International Mobile Subscriber Identification Number (IMSI) resource information of the virtual SIM card is configured on a virtual card slot. The process then proceeds to step 204.

When the communication device 10 detects that the current talk mode is the single-card mode after receiving the initiation instruction for initiating the virtual SIM card, the communication device 10 may configure the IMSI resource information of the virtual SIM card on the virtual card slot by the AP.

In step 204, an accessing operation for allowing the virtual SIM card to access a network is performed based on the IMSI resource information.

The communication device 10 may perform the accessing operation for allowing the virtual SIM card to access a network based on the IMSI resource information by the modem, after the communication device configures the IMSI resource information of the virtual SIM card on the virtual card slot by the AP. The network may be cellular telecommunications network.

Figure 6:
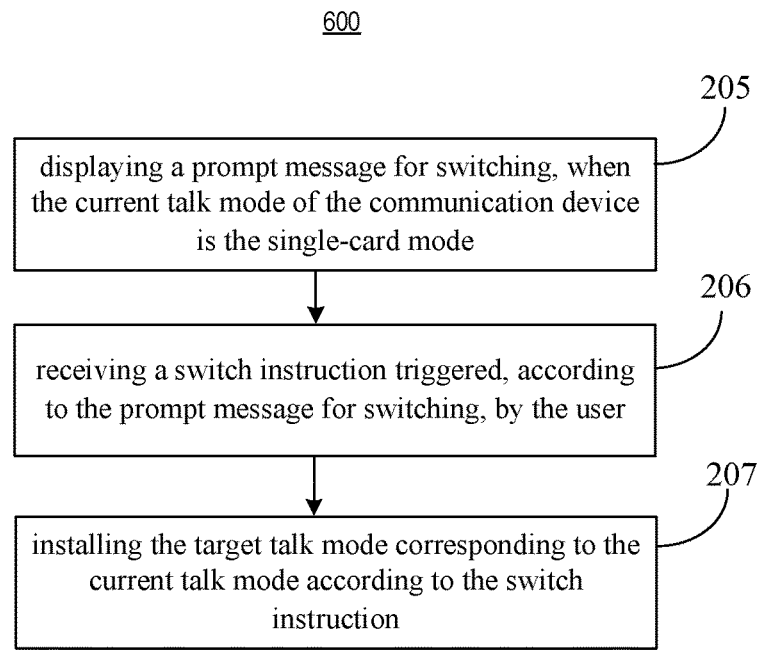
FIG. 6 is a flow diagram for installing a target talk mode corresponding to the current talk mode in the method for enabling a virtual SIM card shown in FIG. 2.

According to some embodiments, as shown in FIG. 6, the process of installing the target talk mode corresponding to the current talk mode according to the current talk mode may include the following steps described by flowchart 600.

In step 205, a prompt message for switching is displayed on the display screen of the communication device 10, when the current talk mode of the communication device is the single-card mode.

The prompt message may include a message prompting the user to switch to the dual-card mode. The prompt message may be a vocal prompt message or a written prompt message.

Figure 7:
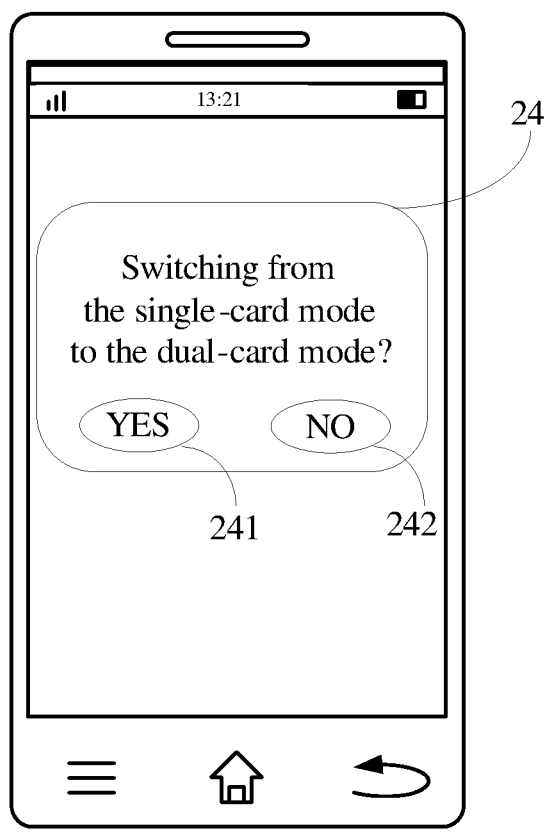
FIG. 7 is a diagram of an interface displaying a prompt message in the method for enabling a virtual SIM card shown in FIG. 2.

When the communication device 10 detects that the current talk mode is the single-card mode after receiving the initiation instruction for initiating the virtual SIM card, the communication device 10 may display the prompt message on the display screen, to prompt the user to switch from the single-card mode to the dual-card mode. For example, FIG. 7 shows an interface displayed on a display screen of communication device 10 displaying a prompt message 24. The user may click on a "YES" button 241, such that the communication device may be switched from the single-card mode to the dual-card mode. Alternatively, the user may click on a "NO" button 242 to exit from the switch process. The display screen of the communication device 10 may be a touch screen to enable selection of the "YES" button 241 or "NO" button 242.

In step 206, a switch instruction triggered, according to the prompt message for switching, by the user is received by the communication device 10.

For example, as shown in FIG. 7, a switch instruction may be generated when the user click on the "YES" button 241. The communication device 10 may then receive the switch instruction.

In step 207, the target talk mode corresponding to the current talk mode is installed according to the switch instruction.

For example, as shown in FIG. 7, the switch instruction may be generated when the user clicks on the "YES" button 241. The communication device 10 may then install the target talk mode corresponding to the current talk mode according to the switch instruction.

Figure 8:
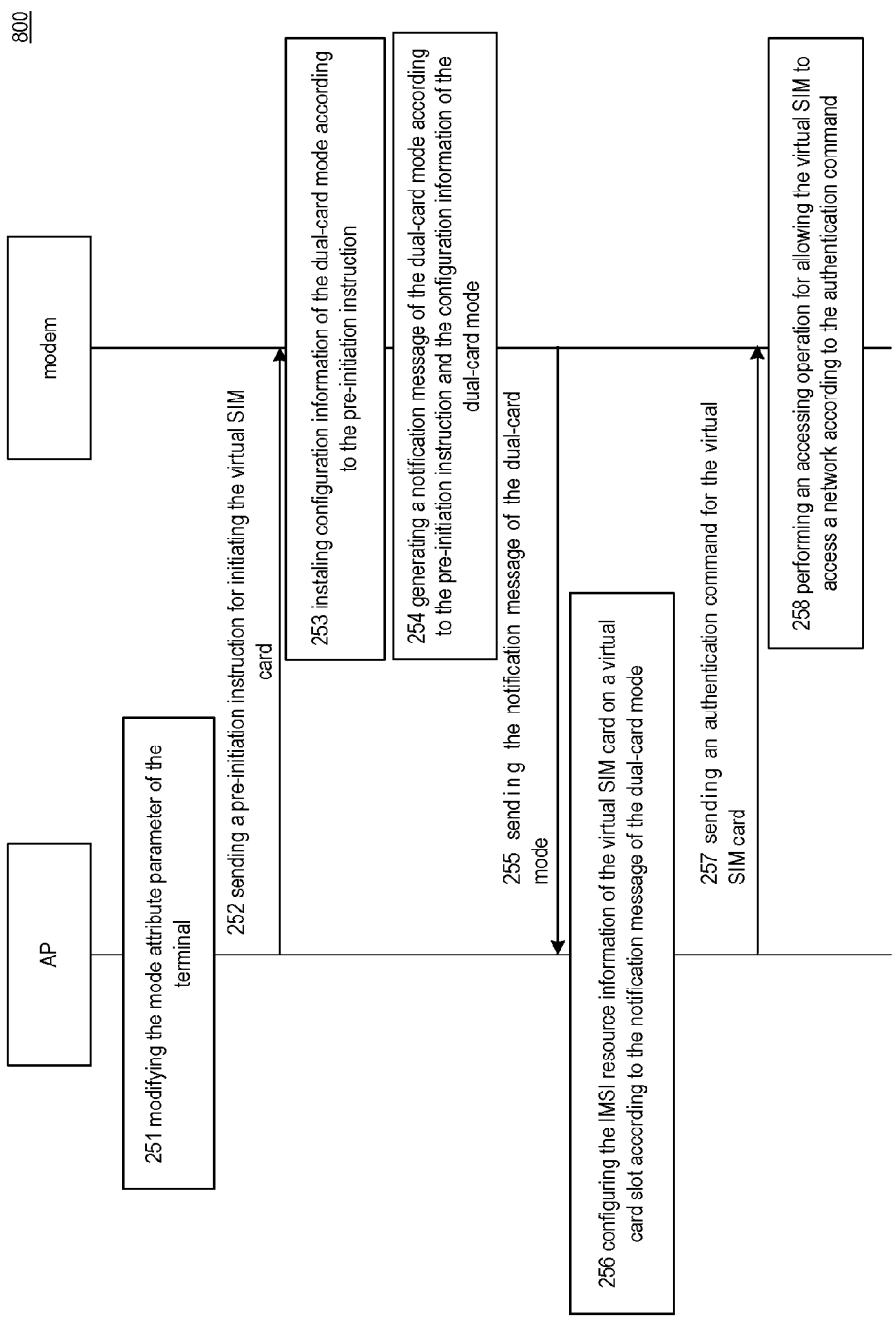
FIG. 8 is a flow diagram for installing a dual-card mode corresponding to a single-card mode in the method for enabling a virtual SIM card shown in FIG. 2.

Further, referring to flow diagram 800 shown in FIG. 8, the process implemented by the communication device 10 for installing the dual-card mode corresponding to the single-card mode may include following steps.

In sub-step 251, the mode attribute parameter of the communication device 10 may be modified by the AP 11.

There is a mode attribute parameter in a communication device's 10 configuration file identifying the talk mode of the communication device 10. The mode attribute parameter may be persist.radio.multisim.config. The AP 11 may dynamically modify the mode attribute parameter and notify the modem 12 of the result of the modification. Since the current talk mode is the single-card mode, persist.radio.multisim.config=none. After the mode attribute parameter of the communication device is amended by its AP 11, persist.radio.multisim.config=dsds.

In sub-step 252, the AP 11 sends a pre-initiation instruction for initiating the virtual SIM card 15 to the modem 12 according to the modified mode attribute parameter.

The AP 11 may modify the mode attribute parameter of a single-card mode communication device 10, and send the pre-initiation instruction for initiating the virtual SIM card to the modem 12, so as to notify the modem of this operation. Then AP 11 may send the pre-initiation instruction for initiating the virtual SIM card 15 to the modem 12 via the communication interface 14 as shown in FIG. 4 or by other means. Embodiments of the disclosure are not limited herein.

In sub-step 253, the modem 12 installs configuration information of the dual-card mode according to the pre-initiation instruction.

The modem 12 may install configuration information of the dual-card mode and configure the dual-card mode according to the pre-initiation instruction, after receiving the pre-initiation instruction for initiating the virtual SIM card 15 sent from the AP 11. The configuration information may include instructions for configuring the communication device 10 to switch from the single-card mode to the dual-card mode, and instructions to operate under the dual-card mode.

In sub-step 254, the modem 12 generates a notification message of the dual-card mode according to the pre-initiation instruction and the configuration information of the dual-card mode.

The notification message of the dual-card mode may be used to indicate that the modem 12 supports the virtual SIM card 15. The modem 12 may notify the AP 11 that the current modem 12 supports the virtual SIM card 15, after installing the configuration information of the dual-card mode.

In sub-step 255, the modem 12 sends the notification message of the dual-card mode to the AP 11.

The modem 12 may be rebooted after installing the configuration information of the dual-card mode according to the pre-initiation instruction. After rebooted, the modem 12 may send the notification message of the dual-card mode to the AP 11, in order to notify the AP 11 that the installation of the configuration information of the dual-card mode has been completed.

In sub-step 256, the AP 11 configures the IMSI resource information of the virtual SIM card 15 on a virtual card slot according to the notification message of the dual-card mode.

International Mobile Subscriber Identification Number (IMSI) is an identifier for distinguishing mobile subscribers. The IMSI may be used to distinguish valid information of mobile subscribers. The AP 11 may configure the IMSI resource information of the virtual SIM card 15 on a virtual card slot of a single-card mode communication device, such that the virtual SIM card 15 does not affect normal use of a physical SIM card. Therefore, the virtual SIM card 15 may coexist with the physical SIM card in a single-card mode communication device. In this way, the AP 11 may modify pre-existing configuration settings to include the new virtual card slot.

In sub-step 257, the AP 11 sends an authentication command for the virtual SIM card 15 to the modem 12 according to the IMSI resource information.

The AP 11 may send the authentication command for the virtual SIM card 15 to the modem 12, after it configures the IMSI resource information of the virtual SIM card 15 on the virtual card slot according to the notification message of the dual-card mode. The authentication is used to protect the network from illegal access. The authentication may prevent network intrusion from a fake user, and may thus guarantee network access of a valid user.

In sub-step 258, the modem 11 performs an accessing operation for allowing the virtual SIM card 15 to access a network according to the authentication command.

According to the authentication command sent from the AP 11, the modem 12 may perform the accessing operation for allowing the virtual SIM card 15 to access a network, and enable the virtual SIM card 15. Related arts may be referenced for particular process of the accessing operation for allowing the virtual SIM card 15 to access a network. With this, the communication device completes the installation of the dual-card mode corresponding to the single-card mode. The virtual SIM card 15 does not affect the normal use of a physical SIM card, since the virtual SIM card 15 and the physical SIM card are installed on different card slots. Therefore, the virtual SIM card 15 may coexist with the physical SIM card in a single-card mode as the device becomes a dual-card mobile communication device.

Moreover, the dual-card mode may include a dual-card dual-pass mode and a dual-card single-pass mode. The dual-card single-pass mode describes a mode where a virtual SIM card and a physical SIM card may not be normally used at the same time, i.e., only one SIM card (physical or virtual) may be used by the communication device 10 at a time. For example, when a user is making a telephone call using the virtual SIM card 15, the physical SIM card is shut down. Then when the user is making a telephone call using the physical SIM card, the virtual SIM card 15 is shut down. That is to say, a virtual SIM card 15 and a physical SIM card in a dual-card single-pass mode communication device 10 may not be used to make a call simultaneously.

The dual-card dual-pass mode describes a mode where a virtual SIM card and a physical SIM card may be normally used at the same time. For example, when a user is making a telephone call using the virtual SIM card 15, there will be a prompt if another telephone call is coming in on the physical SIM card. And the user may determine whether to answer the other telephone call. Therefore, after the communication device 10 is changed from the single-card mode to the dual-card mode, the dual-card single-pass mode may be switched to the dual-card dual-pass mode based on user's demands. Optionally, the dual-card dual-pass mode may be implemented on the basis of the dual-card single-pass mode and utilizing time division multiplexing (TDM) technology. Alternatively, the dual-card dual-pass mode may be implemented by changing hardware structure of the communication device 10, for example, adding a transceiver module (such as, an antenna) for receiving and transmitting a radio electromagnetic wave signal to the communication device 10. As such, an effect that the virtual SIM card 15 and the physical SIM card may be normally used at the same time may be achieved. Please refer to related arts for the particular process of the TDM technology and the addition of an antenna, which will not be repeated herein.

Figure 9:
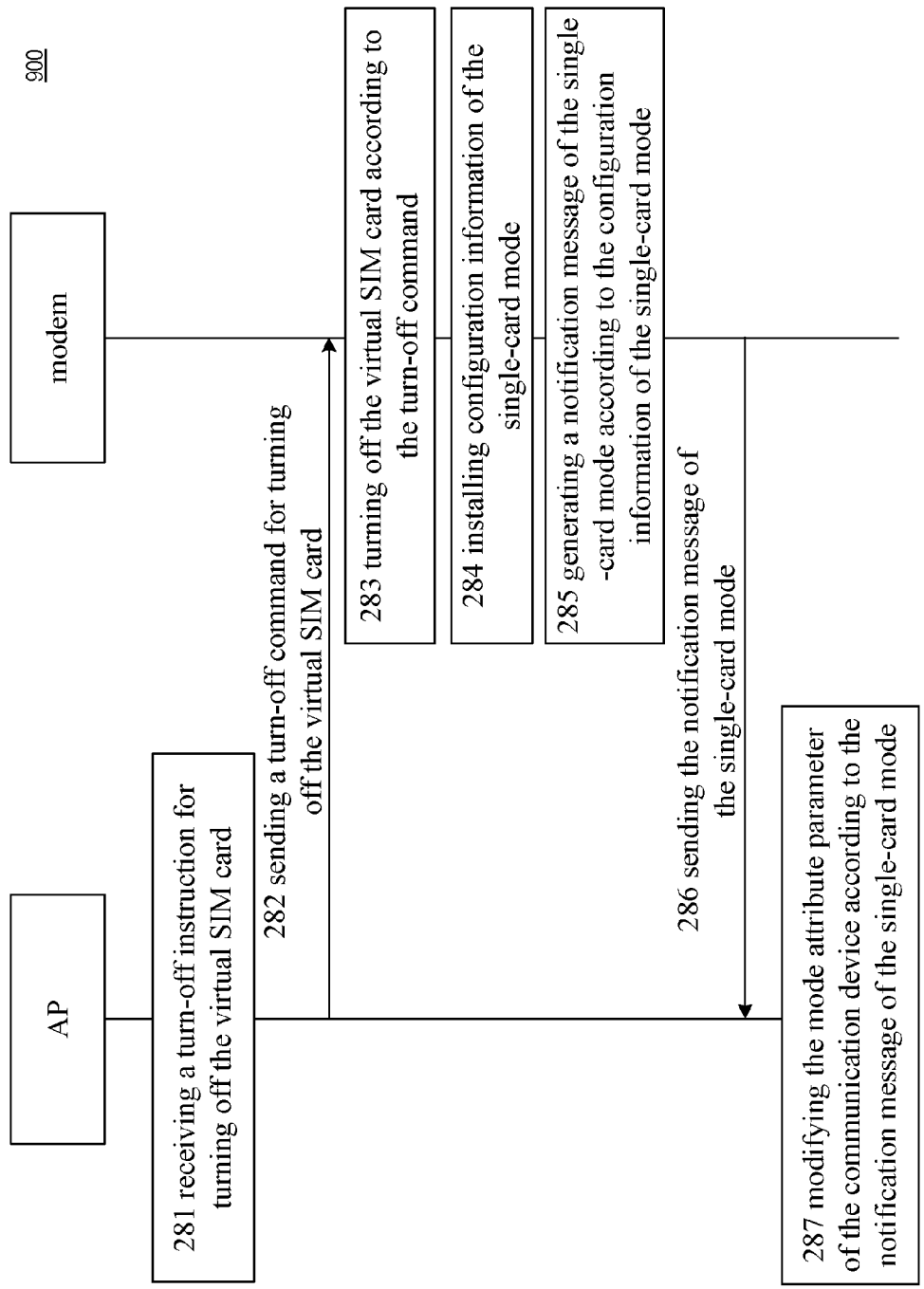
FIG. 9 is a flow diagram for turning off the virtual SIM card in the method for enabling a virtual SIM card shown in FIG. 2.

If a user is unaccustomed with a dual-card mode for the communication device 10 and wants to turn off the virtual SIM card 15 on the communication device 10, the user may turn off the virtual SIM card 15 by a SIM card management interface on the communication device 10. At the same time, a turn-off instruction for turning off the virtual SIM card 15 may be generated. The communication device 10 may receive the turn-off instruction for turning off the virtual SIM card 15, and may turn off the virtual SIM card 15 according to the turn-off instruction. Optionally, referring to FIG. 4, as shown by the flowchart 900 in FIG. 9, the process that the communication device 10 turns off the virtual SIM card 15 may include following steps.

In sub-step 281, the AP 11 receives a turn-off instruction for turning off the virtual SIM card 15.

A turn-off instruction for turning off the virtual SIM card 15 may be generated when a user turns off the virtual SIM card 15 by a SIM card management interface on the communication device 10. The AP 11 may receive the turn-off instruction for turning off the virtual SIM card 15.

In sub-step 282, the AP 11 sends a turn-off command for turning off the virtual SIM card 15 to the modem 12.

Then AP 11 may send the turn-off command for turning off the virtual SIM card 15 to the modem 12 via the communication interface 14 as shown in FIG. 4 or by other communication devices. Embodiments of the disclosure are not limited herein.

In sub-step 283, the modem 12 turns off the virtual SIM card 15 according to the turn-off command.

The modem 12 may turn off the virtual SIM card 15 according to the turn-off command for turning off the virtual SIM card 15 sent from the AP 11.

In sub-step 284, the modem 12 installs configuration information of the single-card mode.

In sub-step 285, the modem 12 generates a notification message of the single-card mode according to the configuration information of the single-card mode.

The notification message of the single-card mode may be used to indicate that the modem 12 supports the single-card mode. The modem 12 may notify the AP 11 that the current modem 12 supports the single-card mode, after installing the configuration information of the single-card mode.

In sub-step 286, the modem 12 sends the notification message of the single-card mode to the AP 11.

In sub-step 287, the AP 11 modifies the mode attribute parameter of the communication device 10 according to the notification message of the single-card mode.

The AP 11 modifies the mode attribute parameter into persist.radio.multisim.config=dsds in step 251. The AP 11 may further modify the mode attribute parameter after receiving the notification message of the single-card mode, such that the value of persist.radio.multisim.config is modified into none.

Accordingly, for the communication device 10 operating under the single-card mode, when a user enables a virtual SIM card, the virtual SIM card will occupy the original physical card slot on the communication device 10. As a result, a physical SIM card may not be used, since no card slot is available. Therefore, the virtual SIM card and the physical card cannot coexist in the same communication device 10. The talk mode of the communication device 10 is always the single-card mode. Thereby, for a single-card mode communication device 10, a problem needs to be solved is how to make the virtual SIM card and the physical card cannot coexist in the same communication device 10. For the communication device 10 operating under the single-card mode with a single physical card slot, the method for enabling a virtual SIM card provided in embodiments of the disclosure may perform an accessing operation for allowing the virtual SIM card to access a network on a virtual card slot, without affecting normal use of a physical SIM card. The communication device 10 operating under the single-card mode changes operation into a dual-card mode in which the virtual SIM card and the physical SIM card may coexist on the communication device 10, after the virtual SIM card is enabled. The communication device may revert back to operation under a single-card mode communication device again after the virtual SIM card is turned off, without affecting normal use of the user. The method for enabling a virtual SIM card brings great convenience to users. The method achieves an effect that the virtual SIM card and the physical SIM card may coexist in the same communication device and implements a switch between the single-card mode and the double-card mode without affecting the user's habit of using the communication device.

In conclusion, the method for enabling a virtual SIM card provided in embodiments of the disclosure may detect the current talk mode of the communication device after the initiation instruction for initiating the virtual SIM card is received; and may install the target talk mode corresponding to the current talk mode when the current talk mode is the single-card mode, in order to change the single-card mode into the dual-card mode. The method for enabling a virtual SIM card may achieve an effect that a virtual SIM card and a physical SIM card may coexist in a single-card mode communication device.

Device embodiments of the disclosure are provided below, which may be used to perform the method embodiments of the disclosure. For details which are not disclosed in the device embodiments, please see the method embodiments.

Figure 10:
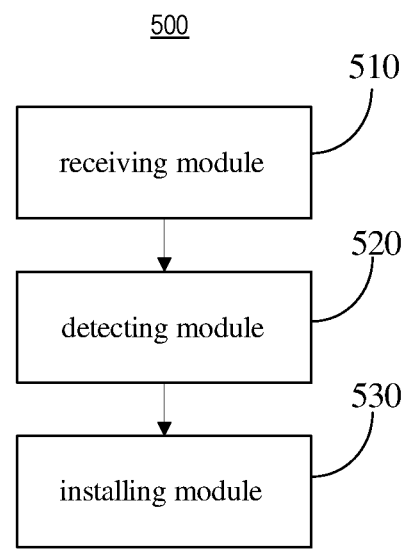
FIG. 10 is a block diagram illustrating a device for enabling a virtual Subscriber Identity Module (SIM) card according to an exemplary embodiment.

FIG. 10 is a block diagram illustrating a communication device 500 for enabling a virtual Subscriber Identity Module (SIM) card according to an exemplary embodiment. The communication device 500 for enabling a virtual SIM card may be applied to a communication device as described herein, and may include following modules.

A receiving module 510 may be configured to receive an initiation instruction for initiating the virtual SIM card.

A detecting module 520 may be configured to detect a current talk mode of a communication device based on the initiation instruction received by the receiving module 510. The current talk mode may include a single-card mode.

An installing module 530 may be configured to install a target talk mode corresponding to the current talk mode detected by the detecting module 520, according to the current talk mode. The target talk mode may include a dual-card mode.

Accordingly, the communication device 1000 for enabling a virtual SIM card provided in embodiments of the disclosure may detect the current talk mode of the communication device 1000 after the initiation instruction for initiating the virtual SIM card is received; and may install the target talk mode corresponding to the current talk mode when the current talk mode is the single-card mode, in order to change operation of the communication device from the single-card mode into the dual-card mode. The communication device 1000 for enabling a virtual SIM card may achieve an effect that a virtual SIM card and a physical SIM card may coexist in a single-card mode of the communication device 1000.

The target talk mode corresponding to the current talk mode may be the dual-card mode, when the current talk mode is the single-card mode.

Figure 11:
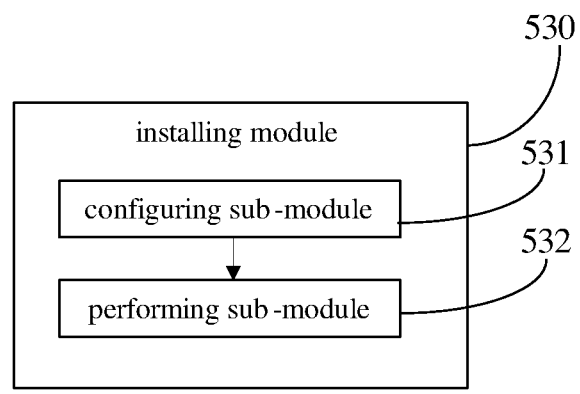
FIG. 11 is a block diagram illustrating an installing module of the device for enabling a virtual SIM card shown in FIG. 10.

FIG. 11 is a block diagram illustrating in more detail an exemplary embodiment of the installing module 530 shown in FIG. 10.

The installing module 530 may include a configuring sub-module 531 and a performing sub-module 532.

The configuring sub-module 531 may be configured to configure International Mobile Subscriber Identification Number (IMSI) resource information of the virtual SIM card on a virtual card slot.

The performing sub-module 532 may be configured to perform an accessing operation for allowing the virtual SIM card to access a network based on the IMSI resource information configured by the configuring sub-module 531.

Figure 12:
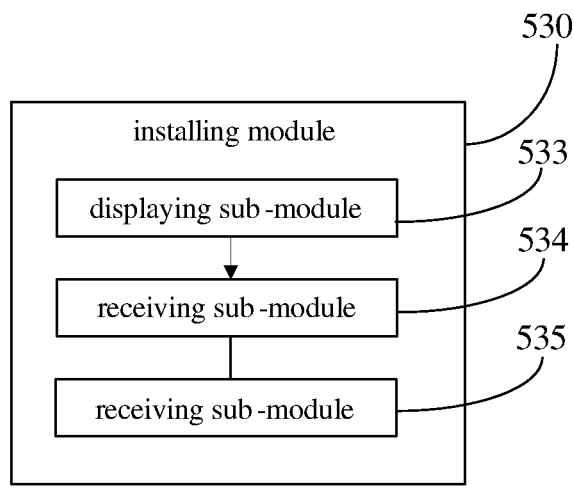
FIG. 12 is a block diagram illustrating another installing module of the device for enabling a virtual SIM card shown in FIG. 10.

FIG. 12 is a block diagram illustrating in more detail another exemplary embodiment of the installing module 530 shown in FIG. 10.

The installing module 530 may include a displaying sub-module 533, a receiving sub-module 534 and an installing sub-module 535.

The displaying sub-module 533 may be configured to display a prompt message for switching, when the current talk mode of the communication device 1000 is the single-card mode. The prompt message for switching is used to prompt a user of the communication device 1000 whether to perform a mode switch.

Optionally, the prompt message for switching may be a prompt message of voice or a prompt message of text.

The receiving sub-module 534 may be configured to receive a switch instruction triggered by the user according to the prompt message for switching displayed by the displaying sub-module 533.

The installing sub-module 535 may be configured to install the target talk mode corresponding to the current talk mode according to the switch instruction received by the receiving sub-module 534.

Figure 13:
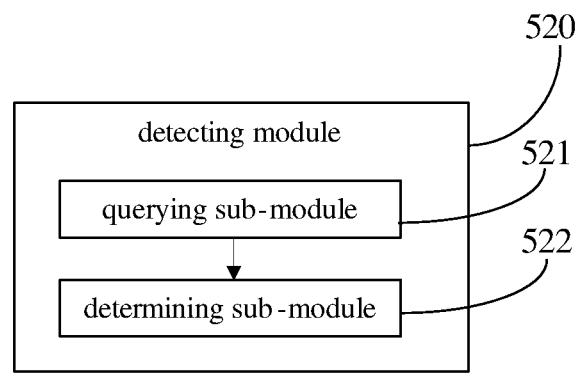
FIG. 13 is a block diagram illustrating a detecting module of the device for enabling a virtual SIM card shown in FIG. 10.

FIG. 13 is a block diagram illustrating in more detail the detecting module 520 shown in FIG. 3-1.

The detecting module 520 may include a querying sub-module 521 and a determining sub-module 522.

The querying sub-module 521 may be configured to query a mode attribute parameter of the communication device 1000 based on the initiation instruction received by the receiving module 510.

The determining sub-module 522 may be configured to determine the current talk mode indicated by the mode attribute parameter queried by the querying sub-module 521.

The communication device 1000 for enabling a virtual SIM card provided in embodiments of the disclosure may detect the current talk mode of the communication device 1000 after the initiation instruction for initiating the virtual SIM card is received; and may install the target talk mode corresponding to the current talk mode when the current talk mode is the single-card mode, in order to change the single-card mode into the dual-card mode. The device for enabling a virtual SIM card may achieve an effect that a virtual SIM card and a physical SIM card may coexist in a single-card mode communication device 1000.

The device for enabling a virtual SIM card as shown in FIG. 10 may be used to perform the flowchart 200 of the method as shown in FIG. 2.

The installing module as shown in FIG. 11 may be used to perform the flowchart 200 of the method as shown in FIG. 2.

The installing module as shown in FIG. 12 may be used to perform the flowchart 600 of the method as shown in FIG. 6.

The detecting module as shown in FIG. 13 may be used to perform the flowchart 500 of the method as shown in FIG. 5.

Figure 14:
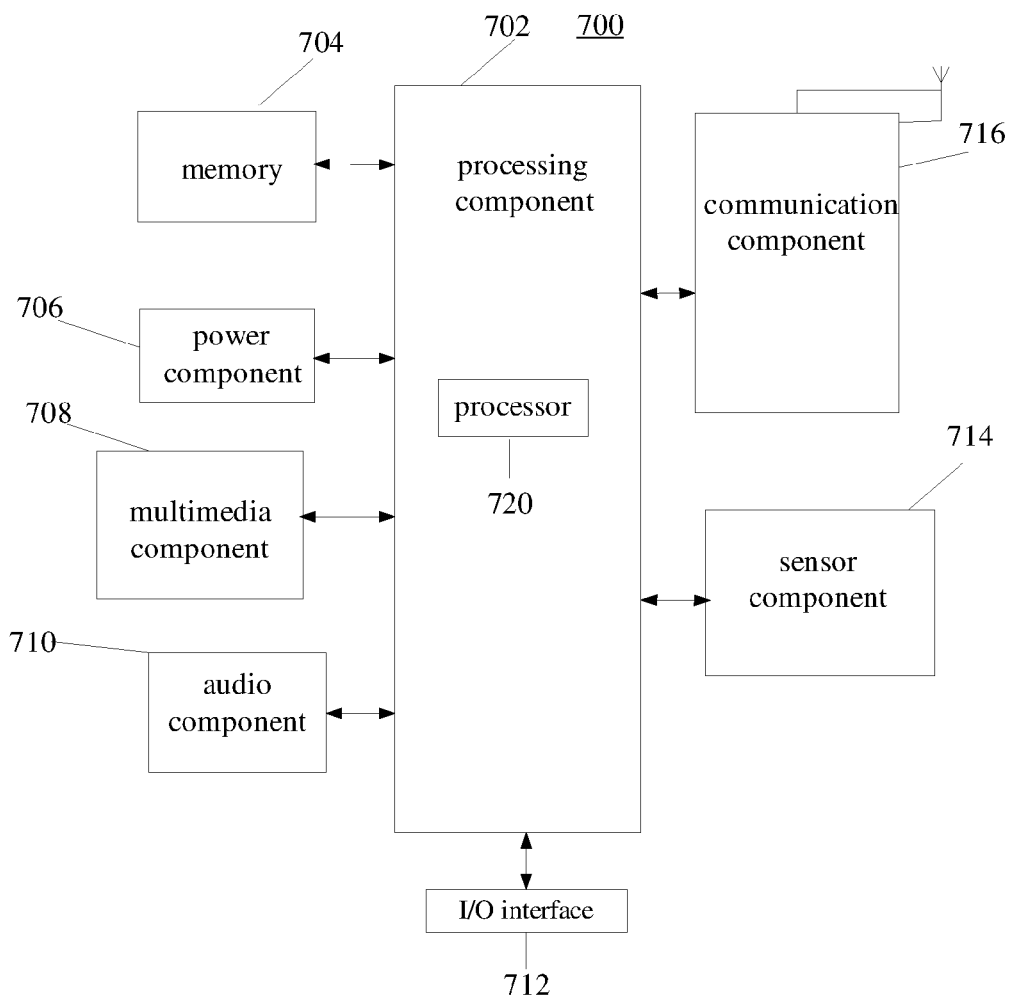
FIG. 14 is a block diagram illustrating a device for enabling a virtual Subscriber Identity Module (SIM) card according to an exemplary embodiment.

FIG. 14 is a block diagram of an device 700 for enabling a virtual SIM card according to an exemplary embodiment. For example, the device 700 may be a mobile phone, a computer, a digital broadcast communication device, a messaging device, a gaming console, a tablet, a medical device, an exercise equipment, a personal digital assistant, and the like.

Referring to FIG. 14, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power for the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have optical focusing and zooming capability.

The audio component 710 is configured to output and/or input audio signals. For example, the audio component 710 includes a microphone (MIC) configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, the peripheral interface modules being, for example, a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components (e.g., the display and the keypad, of the device 700), a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of a nearby object without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G or 3G; or a combination thereof. In an exemplary embodiment, the communication component 716 receives a broadcast signal or broadcast associated information from an external broadcast management system via a broadcast channel. In an exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

The disclosure further provides a non-transitory computer readable storage medium having stored therein instructions that, when executed by the device 700, cause the device 700 to perform the method for enabling a virtual SIM card provided in various embodiments of the disclosure. The method may include: receiving an initiation instruction for initiating the virtual SIM card; detecting a current talk mode of a communication device based on the initiation instruction, the current talk mode includes a single-card mode; and installing a target talk mode corresponding to the current talk mode according to the current talk mode, the target talk mode includes a dual-card mode.

Each module, submodule, or unit discussed herein, may take the form of a packaged functional hardware unit designed for use with other components, a portion of a program code (e.g., software or firmware) executable by the AP 11 or processor 720 or the processing circuitry that usually performs a particular function of related functions, or a self-contained hardware or software component that interfaces with a larger system, for example.

Other embodiments of the disclosure will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for enabling a virtual Subscriber Identity Module (SIM) card on a communication device, the method comprising:
   receiving an initiation instruction for initiating the virtual SIM card;
   initiating operation of the virtual SIM card for enabling a calling function on the communication device based on the initiation instruction;
   determining a current talk mode operating on the communication device; and
   when the current talk mode is determined to be a single-card mode, changing the current talk mode to a dual-card mode.

2. The method of claim 1, wherein changing the current talk mode comprises:
   configuring International Mobile Subscriber Identification Number (IMSI) resource information of the virtual SIM card on a virtual card slot of the communication device; and
   performing an accessing operation for allowing the virtual SIM card to access a network based on the IMSI resource information.

3. The method of claim 2, wherein determining the current talk mode comprises:
   querying a mode attribute parameter of the communication device based on the initiation instruction; and
   determining the current talk mode indicated by the mode attribute parameter.

4. The method of claim 1, wherein changing the current talk mode comprises:
   when the current talk mode of the communication device is the single-card mode, displaying a prompt message on a display screen of the communication device, the prompt message prompting a user on whether to perform a mode switch;
   receiving a switch instruction triggered by a user command input through the prompt message; and
   installing a target talk mode corresponding to the current talk mode according to the switch instruction.

5. The method of claim 4, wherein determining the current talk mode comprises:
   querying a mode attribute parameter of the communication device based on the initiation instruction; and
   determining the current talk mode indicated by the mode attribute parameter.

6. The method of claim 4, wherein the prompt message is a voice based prompt message or a text based prompt message.

7. The method of claim 1, wherein determining the current talk mode comprises:
   querying a mode attribute parameter of the communication device based on the initiation instruction; and
   determining the current talk mode indicated by the mode attribute parameter.

8. The method of claim 1, further comprising:
   receiving a switch instruction triggered by a user command input through a prompt message displayed on a display screen of the communication device; and
   dynamically changing a mode attribute parameter according to the switch instruction.

9. A device for enabling a virtual Subscriber Identity Module (SIM) card, comprising:
   a processor; and
   a memory for storing processor executable instructions;
   wherein the processor is configured to communicate with the memory and execute the processor executable instructions to:
      receive an initiation instruction for initiating the virtual SIM card;
      initiate operation of the virtual SIM card for enabling a calling function on the communication device based on the initiation instruction;
      determine a current talk mode operating on the communication device; and
      when the current talk mode is determined to be a single-card mode, change the current talk mode to a dual-card mode.

10. The device of claim 9, wherein the processor is configured to execute the processor executable instructions to change the current talk mode to:
    configure International Mobile Subscriber Identification Number (IMSI) resource information of the virtual SIM card on a virtual card slot of the communication device; and
    perform an accessing operation for allowing the virtual SIM card to access a network based on the IMSI resource information.

11. The device of claim 10, wherein the processor is configured to execute the processor executable instructions to determine the current talk mode to:
    query a mode attribute parameter of the communication device based on the initiation instruction; and
    determine the current talk mode indicated by the mode attribute parameter.

12. The device of claim 11, wherein the processor is further configured to execute the processor executable instructions to:
    receive a switch instruction triggered by a user command input through a prompt message displayed on a display screen of the communication device; and
    dynamically change the mode attribute parameter according to the switch instruction.

13. The device of claim 9, wherein the processor is configured to execute the processor executable instructions to change the current talk mode to:
    when the current talk mode of the communication device is the single-card mode, display a prompt message on a display screen of the communication device, the prompt message prompting a user on whether to perform a mode switch;
    receive a switch instruction triggered by user command input through the prompt message; and
    install a target talk mode corresponding to the current talk mode according to the switch instruction.

14. The device of claim 13, wherein the processor is configured to execute the processor executable instructions to determine the current talk mode to:
    query a mode attribute parameter of the communication device based on the initiation instruction; and
    determine the current talk mode indicated by the mode attribute parameter.

15. The device of claim 13, wherein the prompt message for switching is a prompt message of voice or a prompt message of text.

16. The device of claim 9, wherein the processor is configured to execute the processor executable instructions to determine the current talk mode to:
    query a mode attribute parameter of the communication device based on the initiation instruction; and
    determine the current talk mode indicated by the mode attribute parameter.

17. A non-transitory computer-readable storage medium including processor executable instructions stored thereon, the processor executable instructions causing a processor of a communication device to:
    receive an initiation instruction for initiating a virtual Subscriber Identity Module (SIM) card;
    initiate operation of the virtual SIM card for enabling a calling function on the communication device based on the initiation instruction;
    determine a current talk mode operating on the communication device; and
    in response to determining the current talk mode is a single-card mode, change the current talk mode to a dual-card mode.

18. The non-transitory computer-readable storage medium of claim 17, wherein the processor executable instructions cause the processor of the communication device to change the current talk mode by:
    configuring International Mobile Subscriber Identification Number (IMSI) resource information of the virtual SIM card on a virtual card slot of the communication device; and
    performing an accessing operation for allowing the virtual SIM card to access a network based on the IMSI resource information.

19. The non-transitory computer-readable storage medium of claim 17, wherein the processor executable instructions cause the processor of the communication device to determine the current talk mode by:
    querying a mode attribute parameter of the communication device based on the initiation instruction; and
    determining the current talk mode indicated by the mode attribute parameter.

20. The non-transitory computer-readable storage medium of claim 17, wherein the processor executable instructions cause the processor of the communication device to change the current talk mode by:
    when the current talk mode of the communication device is the single-card mode, displaying a prompt message on a display screen of the communication device, the prompt message prompting a user on whether to perform a mode switch;
    receiving a switch instruction triggered by a user command input through the prompt message; and
    installing a target talk mode corresponding to the current talk mode according to the switch instruction.

* * * * *